(12) United States Patent
Vermeersch et al.

(10) Patent No.: US 11,623,679 B2
(45) Date of Patent: Apr. 11, 2023

(54) ENERGY ABSORBING STRAP ASSEMBLY FOR A STEERING COLUMN

(71) Applicant: Steering Solutions IP Holding Corporation, Saginaw, MI (US)

(72) Inventors: Michael C. Vermeersch, Flushing, MI (US); Ronald J. Huntley, Bay City, MI (US); Benjamin D. Reichard, Saginaw, MI (US); Arthur W. Nellett, Davison, MI (US); Carl T. Seamon, New Lothrop, MI (US)

(73) Assignee: Steering Solutions IP Holding Corporation, Saginaw, MI (US)

(*) Notice: Subject to any disclaimer, the term of this patent is extended or adjusted under 35 U.S.C. 154(b) by 0 days.

(21) Appl. No.: 17/519,289

(22) Filed: Nov. 4, 2021

(65) Prior Publication Data

US 2022/0135114 A1    May 5, 2022

Related U.S. Application Data

(60) Provisional application No. 63/109,771, filed on Nov. 4, 2020.

(51) Int. Cl.
*B62D 1/19* (2006.01)
*B62D 1/185* (2006.01)

(52) U.S. Cl.
CPC .............. *B62D 1/192* (2013.01); *B62D 1/185* (2013.01)

(58) Field of Classification Search
CPC ................................ B62D 1/192; B62D 1/185
See application file for complete search history.

(56) References Cited

U.S. PATENT DOCUMENTS

| | | | | |
|---|---|---|---|---|
| 5,562,307 | A  * | 10/1996 | Connor | B62D 1/195 |
| | | | | 188/371 |
| 6,224,104 | B1 * | 5/2001 | Hibino | F16F 7/123 |
| | | | | 280/777 |
| 10,315,682 | B2 * | 6/2019 | Agbor | B62D 1/185 |
| 10,464,592 | B2 * | 11/2019 | Messing | F16H 25/20 |
| 10,532,762 | B2 * | 1/2020 | Sulser | B62D 1/195 |
| 10,807,631 | B2 * | 10/2020 | Lingemann | B62D 1/184 |
| 11,242,083 | B2 * | 2/2022 | Schnitzer | B62D 1/192 |
| 2016/0121920 | A1 * | 5/2016 | Klepp | B62D 1/195 |
| | | | | 74/492 |

FOREIGN PATENT DOCUMENTS

| | | | | |
|---|---|---|---|---|
| CN | 112141203 A | * | 12/2020 | ............. B62D 1/16 |
| WO | WO-2019030175 A1 | * | 2/2019 | ............. B62D 1/185 |

* cited by examiner

*Primary Examiner* — Drew J Brown
(74) *Attorney, Agent, or Firm* — Dickinson Wright PLLC

(57) ABSTRACT

A steering column assembly includes an upper jacket. The steering column assembly also includes a lower jacket that the upper jacket is telescopingly coupled to. The steering column assembly further includes an energy absorbing strap operatively coupled to the upper jacket and the lower jacket, the energy absorbing strap having a first leg, a second leg and a U-shaped portion connecting the first leg and the second leg. The steering column assembly yet further includes a pin located within a slot defined by the first leg and the second leg of the energy absorbing strap.

8 Claims, 5 Drawing Sheets

ENERGY ABSORBING STRAP ASSEMBLY FOR A STEERING COLUMN

CROSS-REFERENCE TO RELATED APPLICATION

This application claims the benefits of priority to U.S. Provisional Patent Application Ser. No. 63/109,771, filed Nov. 4, 2020, the disclosure of which is incorporated by reference herein in its entirety.

FIELD OF THE INVENTION

The embodiments disclosed herein relate to vehicle steering column assemblies and, more particularly, to an energy absorbing strap assembly for vehicle steering column assemblies.

BACKGROUND

On adjustable steering columns, energy absorbing straps are utilized to absorb an occupant's mass during a collapse event of the steering column. Certain vehicle energy absorbing systems require a high load or non-collapsing steering column design to help maintain optimal occupant positioning during an impact event. Prior apparatuses used a pyrotechnic device to help increase the collapse load when required, but are not cost effective in today's market. OEM's are asking for a more cost competitive solution.

SUMMARY OF THE DISCLOSURE

According to one aspect of the disclosure, a steering column assembly includes an upper jacket. The steering column assembly also includes a lower jacket that the upper jacket is telescopingly coupled to. The steering column assembly further includes an energy absorbing strap operatively coupled to the upper jacket and the lower jacket, the energy absorbing strap having a first leg, a second leg and a U-shaped portion connecting the first leg and the second leg. The steering column assembly yet further includes a pin located within a slot defined by the first leg and the second leg of the energy absorbing strap.

According to another aspect of the disclosure, a steering column assembly includes an upper jacket. The steering column assembly also includes a lower jacket that the upper jacket is telescopingly coupled to. The steering column assembly further includes an energy absorbing strap operatively coupled to the upper jacket and the lower jacket, the energy absorbing strap having a first leg, a second leg and a U-shaped portion connecting the first leg and the second leg. The steering column assembly yet further includes a resistance feature located within a slot defined by the first leg and the second leg of the energy absorbing strap.

These and other advantages and features will become more apparent from the following description taken in conjunction with the drawings.

BRIEF DESCRIPTION OF DRAWINGS

The subject matter that is regarded as the subject invention is particularly pointed out and distinctly claimed in the claims at the conclusion of this specification. The foregoing and other features and advantages of the invention are apparent from the following detailed description of non-limiting exemplary embodiments of the invention taken in conjunction with the accompanying drawing thereof in which:

DETAILED DESCRIPTION

The embodiments described herein may be utilized in a vehicle, such as a car, truck, sport utility vehicle, crossover, mini-van, marine craft, aircraft, all-terrain vehicle, recreational vehicle, or other suitable vehicle, include various steering system schemes, for example, steer-by-wire and driver interface steering. These steering system schemes typically include a steering column for translating steering input to an output that interacts with a steering linkage to ultimately cause the vehicle wheels (or other elements) to turn the vehicle. Some steering columns are axially adjustable between positions to provide flexibility in the location of a steering input device (e.g. hand wheel) and facilitate more comfortable driving positions for different sizes of drivers or autonomous driving capability. Many axially adjustable steering columns further include rake actuators that permit tilt movement around one or more pivot points. Telescopic steering columns with both rake and axial movement can require a large amount of space to operate in the underlying structure.

In addition to providing adjustability, axially adjustable steering column assemblies may also include a collapsible functionality that provides safety advantages during an energy absorption event. A locking mechanism is oftentimes required to maintain a moveable portion of the steering column assembly at a desired position after axial adjustment. One type of commonly used locking mechanism in the automotive industry is called a telescoping positive lock mechanism. When designing a telescoping positive lock mechanism, attention must be taken to allow for proper column locked and unlocked conditions. The unlocked condition must ensure for the allowance of full telescopic/axial range of adjustment. When the steering column assembly is locked, the steering column assembly must maintain a fixed telescopic/axial position while under normal vehicle operating conditions. However, during a collapse event various measures may be implemented to ensure a required collapse condition and/or range of motion while within a range applied load.

Referring now to the Figures, wherein like numerals indicate corresponding parts, the subject invention is described below with reference to specific non-limiting embodiments thereof. The embodiments described herein relate to an energy absorbing assembly associated with a steering column (also referred to herein as a "steering column assembly"). The axial adjustability described herein can result from relative movement between two or more jackets that permit axial movement therebetween. For example, a first jacket and a second jacket that move in a relative telescopic, sliding, or translational configuration.

Figure 1:
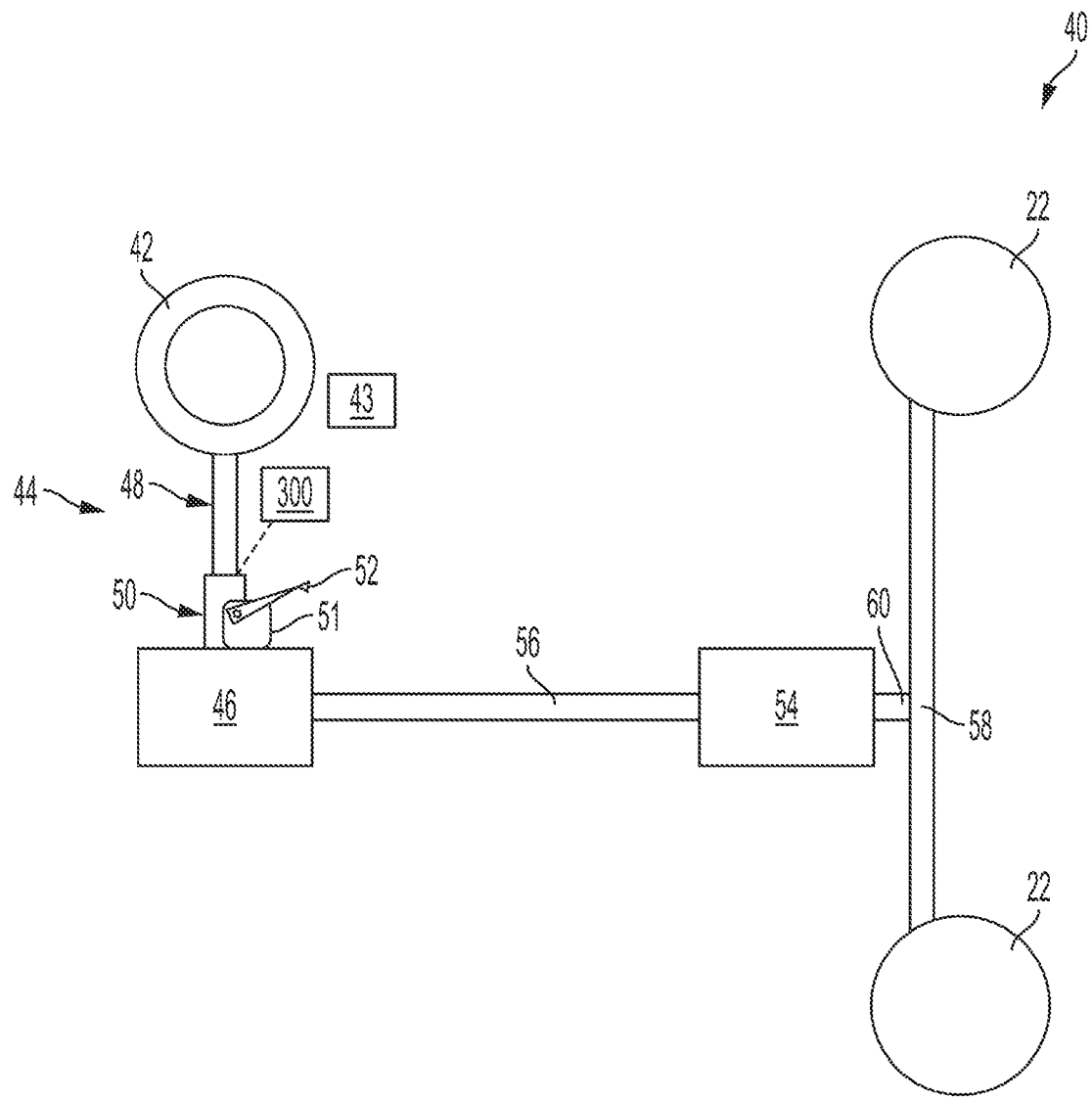
FIG. 1 is a schematic illustration of a steering column assembly.

Referring initially to FIG. 1, a steering system 40 for a vehicle is generally illustrated according to the principles of the present disclosure. As described above, the vehicle may be any suitable vehicle, such as a car, a truck, a sport utility vehicle, a mini-van, a crossover, any other passenger vehicle, or any suitable commercial vehicle, for example. Moreover, principles of the present disclosure may apply to other vehicles, such as planes, boats, trains, drones, or other suitable vehicles.

The steering system 40 may be configured as a driver interface steering system, an autonomous driving system, or a system that allows for both driver interface and autonomous steering. The steering system may include an input device 42, such as a steering wheel, wherein a driver may mechanically provide a steering input by turning the steering wheel. An airbag device 43 may be located on or near the input device 42. A steering column assembly 44 extends along an axis from the input device 42 to an output assembly 46. The output assembly 46 may include a pinion shaft assembly, an I-shaft, a cardan joint, steer-by-wire components or any other features conventionally located opposite the input device 42. The steering column assembly 44 may include at least two axially adjustable parts, for example, a first jacket 48 and a second jacket 50 that are axially adjustable with respect to one another. The first jacket 48 and the second jacket 50 may be alternatively configured as brackets, rails, or other members that permit axial movement therebetween. The axial movement may include sliding, telescopic, translating, and other axial movements. The steering column assembly 44 may include a mounting bracket 51 that at least partially connects the steering column to the vehicle. An adjustable lever 52 may be operably connected to one of the first jacket 48, the second jacket 50, or the bracket 51 to facilitate axial and/or tilting adjustment of the steering column assembly 44. In some embodiments, behavior of the adjustable lever 52 may be controlled via a control system 300 including a CPU unit. In some embodiments, behavior of the adjustable lever 52 may be controlled manually.

The steering column assembly 44 is moveable between a range of positions from an extended position to a retracted position. In the extended position, the first jacket 48 and second jacket 50 are moved axially away from each other so that the input device 42 is located near an operator of the vehicle. In the retracted position, the first jacket 48 and second jacket 50 are moved axially towards each other so that the input device 42 is located away from an operator of the vehicle. In some embodiments, the retracted position may correspond to stowing the input device 42. For example, it may be beneficial to place the input device 42 in a stowed location during autonomous driving. In some embodiments, the retracted position can be on the order of about 150 mm away from the extended position, such as at least 100 mm, or at least about 125 mm away from the extended position. In some embodiments, the adjustable lever 52 effectuates axial movement between the first jacket 48 and second jacket 50 to adjustment between the extended position and the retracted position. In some embodiments, the adjustable lever 52 effectuates rake or tilt movement of the steering column assembly 44.

A steering gear assembly 54 may connect to the output assembly 46 via a steering gear input shaft 56. The steering gear assembly 54 may be configured as a rack-and-pinion, a recirculating ball-type steering gear, or any other types of steering gears associated with autonomous and driver-interface steering systems. The steering gear assembly 54 may then connect to a driving axle 58 via an output shaft 60. The output shaft 60 may include a pitman arm and sector gear or other traditional components. The output shaft 60 is operably connected to the steering gear assembly 54 such that a rotation of the steering gear input shaft 56 causes a responsive movement of the output shaft 60 and causes the drive axel to turn the wheels 22.

Referring now to FIGS. 2-7, a portion of the steering column assembly 44 is shown to illustrate various embodiments of an energy absorbing assembly 100. The disclosed embodiments maintain telescope adjustment of a portion of the steering column assembly 44. The upper jacket 48 is movable, relative to the lower jacket 50, during a normal operating condition of the vehicle to telescopically adjust a position of the steering input device 42 along the longitudinal axis of the steering column assembly 44. The normal operating condition (also referred to herein as a first condition of the steering column) is defined as a normal driving condition that allows adjustment of the upper jacket 48 over a predefined range of telescoping movement that is suitable for driving.

The steering column assembly 44 is also operable in a second operating condition defined as a non-collapsible condition of the upper jacket 48 during an energy absorbing event. In this condition, energy-absorbing movement (i.e., energy absorbing collapsibility) of the upper jacket 48 along the longitudinal axis within the lower jacket 50 is resisted up to a high load.

The energy absorbing assembly 100 includes an energy absorbing strap 102. The energy absorbing strap 102 is operatively coupled to various components in the normal operating condition. The energy absorbing strap 102 includes a first leg 104, a second leg 106, and a substantially U-shaped portion 108 that connects the first leg 104 and the second leg 106. The first leg 104 is coupled to the lower jacket 50 with a pin 110 or the like. The second leg 106 is operatively coupled to the upper jacket 48.

Figure 2:
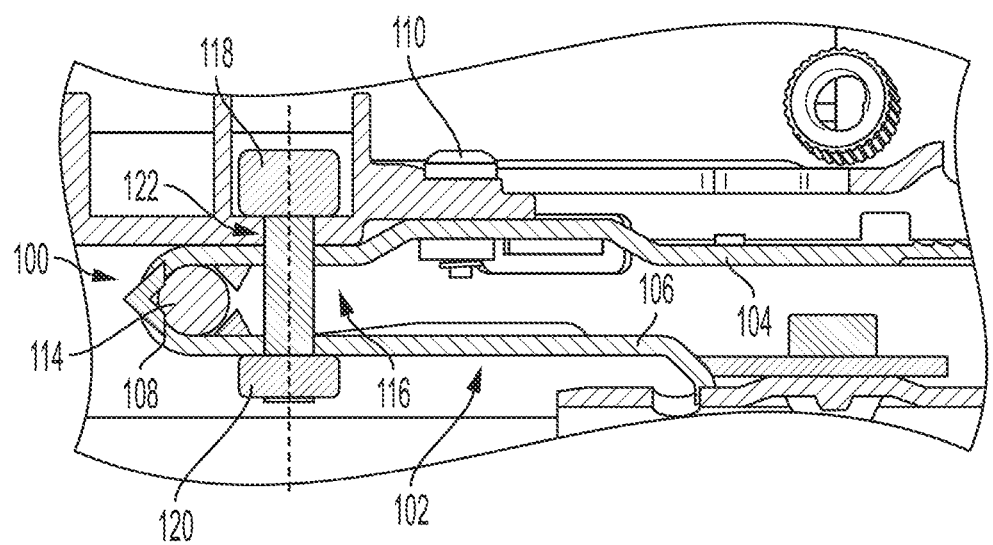
FIG. 2 is a side, elevational cross-sectional view of an energy absorbing strap assembly.
Figure 3:
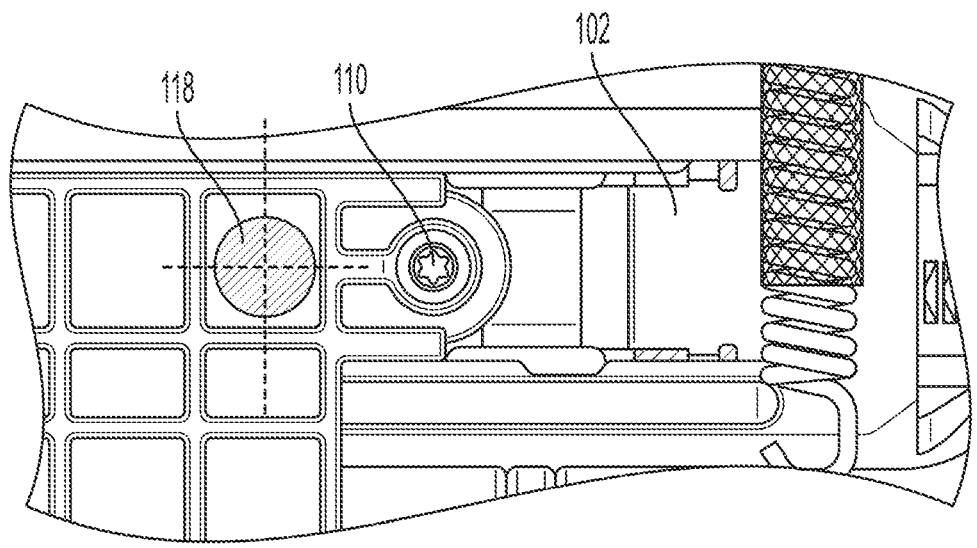
FIG. 3 is a top plan view of the energy absorbing strap assembly of FIG. 1.

FIGS. 2-7 illustrate various structural features that resist or prevent rolling of the energy absorbing strap 102. In particular, FIGS. 2 and 3 illustrate a pin 114 that is located within a slot 116 defined by the energy absorbing strap 102, with the slot 116 being the space between the first leg 104 and the second leg 106 of the energy absorbing strap 102. The pin 104 is welded to inner portions of the energy absorbing strap 102 in some embodiments. In the illustrated embodiment, the pin 114 is welded to an inner surface of the U-shaped portion 108 of the energy absorbing strap 102. The pin 104 may be a solid metal component, such as solid steel, for example.

Figure 4:
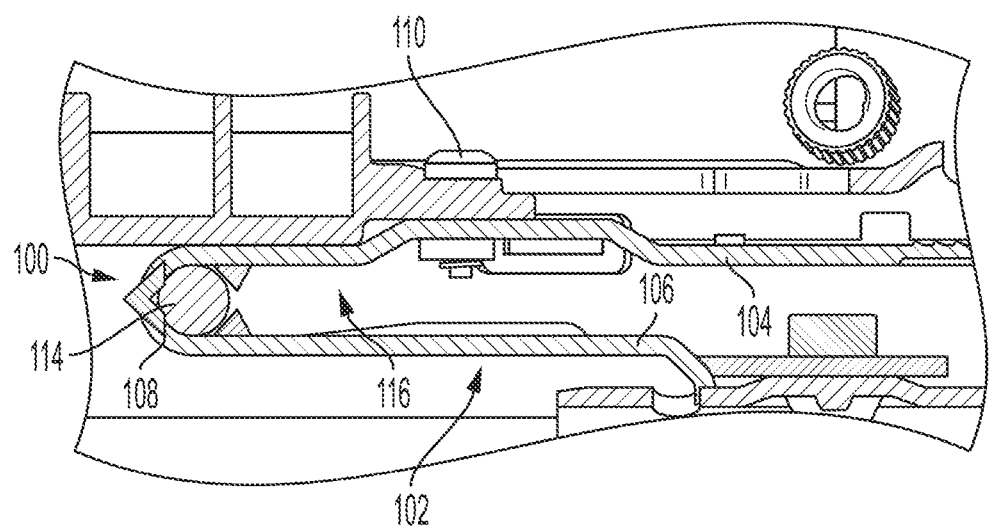
FIG. 4 is a side, elevational cross-sectional view of an energy absorbing strap assembly according to another aspect of the disclosure.
Figure 5:
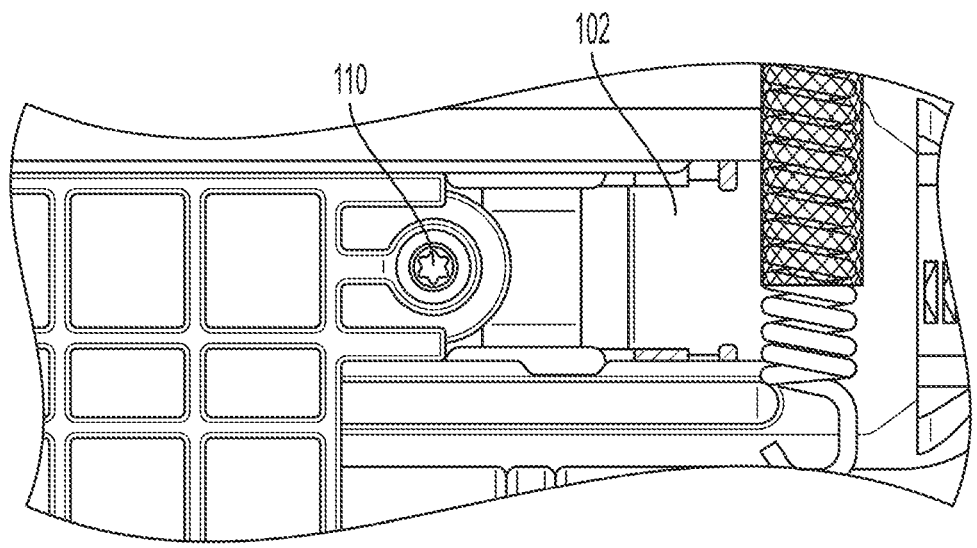
FIG. 5 is a top plan view of the energy absorbing strap assembly of FIG. 3.

FIGS. 2 and 3 illustrate the assembly with a bolt 118 that extends through the first leg 104 and the second leg 106 of the energy absorbing strap 102 and through the lower jacket 50. A nut 120 secures the bolt 118 to the energy absorbing strap 102. In the illustrated embodiment, the bolt 118 is positioned within a wire harness locating hole 122 of the lower jacket 50. FIGS. 4 and 5 show an embodiment of the energy absorbing assembly 100 that does not include the above-described bolt 118.

Figure 6:
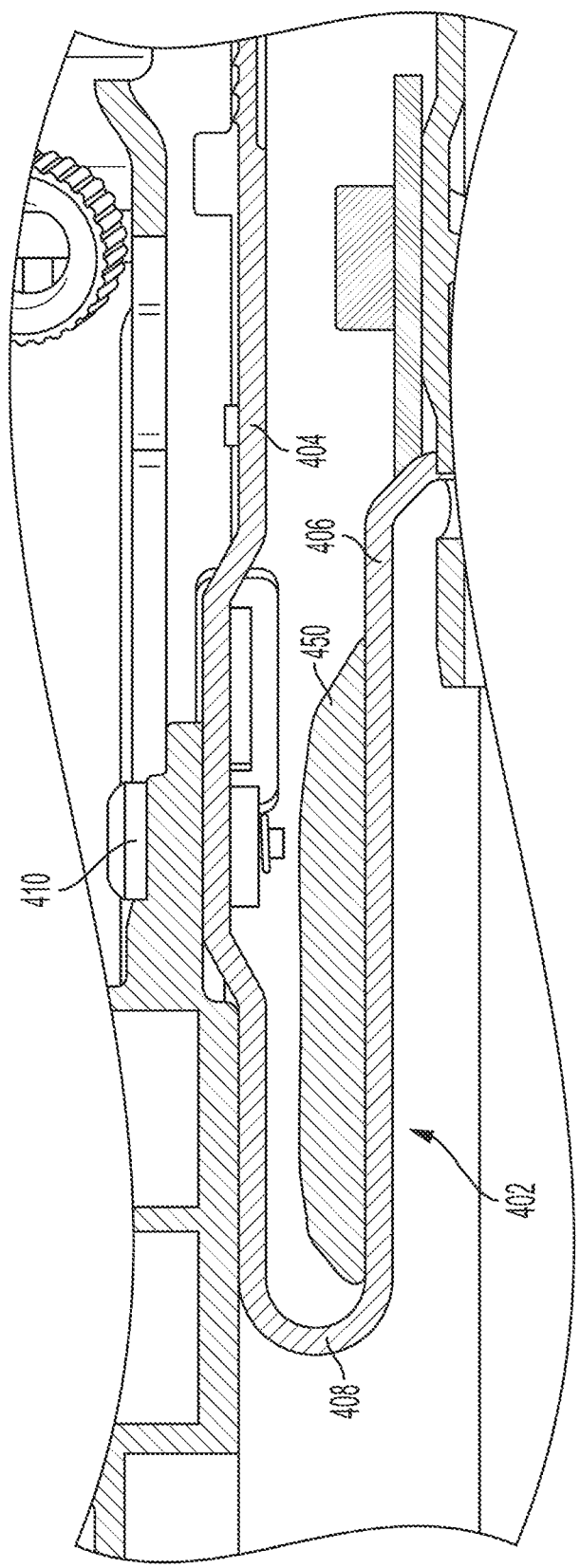
FIG. 6 is a side, elevational cross-sectional view of an energy absorbing strap assembly according to another aspect of the disclosure.

FIG. 6 illustrates the energy absorbing assembly according to another embodiment of the disclosure, which is referenced with numeral 400. The energy absorbing assembly 400 includes an energy absorbing strap 402. The energy absorbing strap 402 is operatively coupled to various components in the normal operating condition. The energy absorbing strap 402 includes a first leg 404, a second leg 406, and a substantially U-shaped portion 408 that connects the first leg 404 and the second leg 406. The first leg 404 is coupled to the lower jacket 50 with a pin 410 or the like. The second leg 406 is operatively coupled to the upper jacket 48.

The embodiment of FIG. 6 also includes a feature that resists or prevents rolling of the energy absorbing strap 402. In particular, a bump 450 is welded to an inner surface of one of the legs 404, 406 of the energy absorbing strap 402. In the illustrated embodiment, the bump 450 is secured to the inner surface of the second leg 406. The bump 450 is positioned to interfere with the collapsing motion of the energy absorbing strap 402 to meet a desired load resistance. The bump 450 may be integrally formed with, or operatively coupled to, the energy absorption strap 402. For example, the bump 450 could be a second piece such as a solid rod welded to second surface 406 (i.e., operatively coupled) or a cold formed deep draw depression or gusset (i.e., integrally formed) to prevent rolling of the strap 402.

Figure 7:
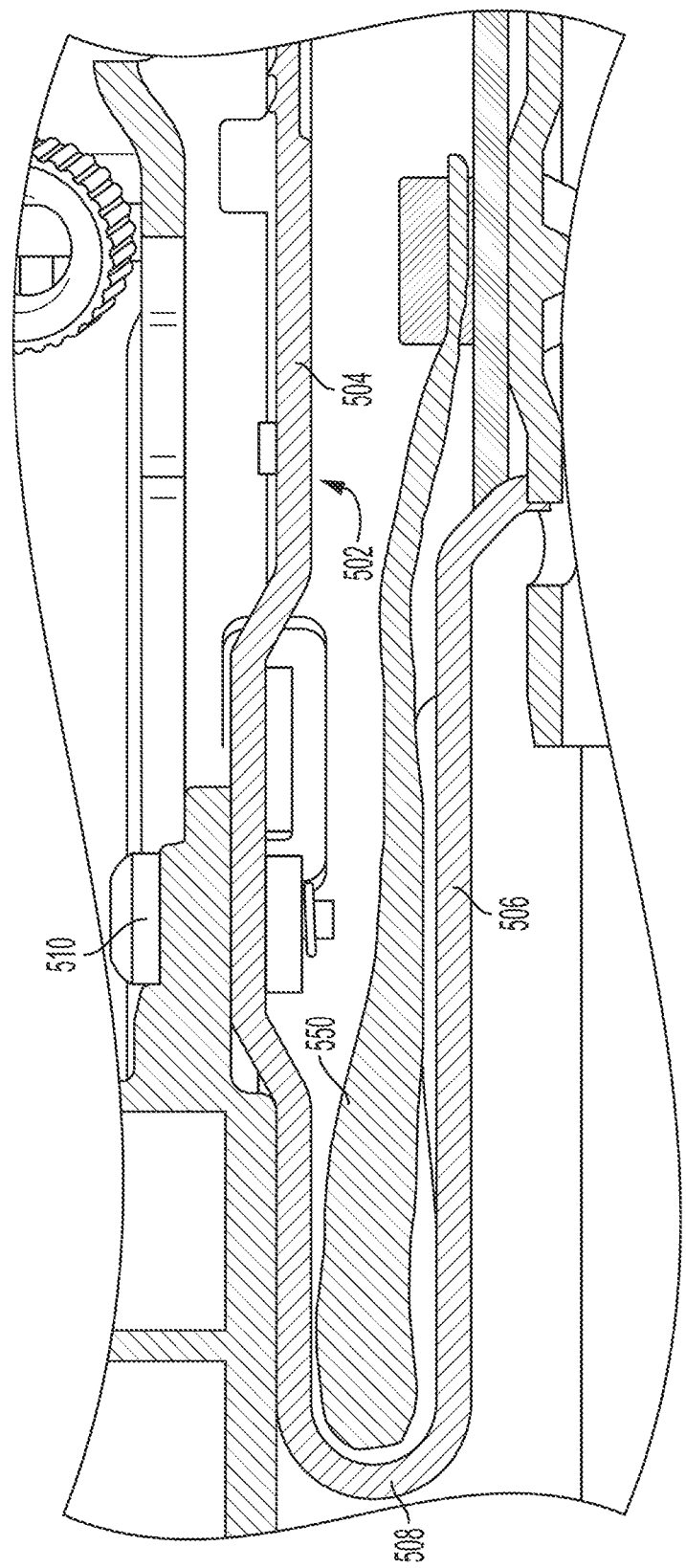
FIG. 7 is a side, elevational cross-sectional view of an energy absorbing strap assembly according to another aspect of the disclosure.

FIG. 7 illustrates the energy absorbing assembly according to another embodiment of the disclosure, which is referenced with numeral 500. The energy absorbing assembly 500 includes an energy absorbing strap 502. The energy absorbing strap 502 is operatively coupled to various components in the normal operating condition. The energy absorbing strap 502 includes a first leg 504, a second leg 506, and a substantially U-shaped portion 508 that connects the first leg 504 and the second leg 506. The first leg 504 is coupled to the lower jacket 50 with a pin 510 or the like. The second leg 506 is operatively coupled to the upper jacket 48.

The embodiment of FIG. 7 also includes a feature that resists or prevents rolling of the energy absorbing strap 502. In particular, a wedge 550 is operatively coupled to the upper jacket 48 proximate the mounting location of the energy absorbing strap 502 to the upper jacket 48. The wedge 550 extends within the space defined by the legs 504, 506 of the energy absorbing strap 502 to interfere with the collapsing motion of the energy absorbing strap 502 to meet a desired load resistance.

The embodiments disclosed herein and shown in the Figures maintain an existing packaging envelope, column adjustment telescope and rake travel requirements, positive lock design, minimal changeover in manufacturing footprint, does not require coordinated customer changes, and is a cost effective alternative to pyro high load designs.

While the invention has been described in detail in connection with only a limited number of exemplary embodiments, it should be appreciated that the invention is not limited to such embodiments. Rather, the invention can be modified to incorporate any number of variations, alterations, substitutions, or equivalent arrangements not heretofore described, but that are commensurate with the spirit and scope of the invention. Additionally, while various non-limiting exemplary embodiments of the invention have been described, it should be appreciated that aspects of the invention may include only some of these embodiments. Accordingly, the invention is not to be seen as limited by the foregoing description.

Having thus described the invention, it is claimed:

1. A steering column assembly comprising:
an upper jacket;
a lower jacket that the upper jacket is telescopingly coupled to;
an energy absorbing strap operatively coupled to the upper jacket and the lower jacket, the energy absorbing strap having a first leg, a second leg and a U-shaped portion connecting the first leg and the second leg; and
a pin located within a slot defined by the first leg and the second leg of the energy absorbing strap, wherein the pin is located adjacent an inner surface of the U-shaped portion of the energy absorbing strap, wherein the pin is welded to the inner surface of the U-shaped portion of the energy absorbing strap.

2. A steering column assembly comprising:
an upper jacket;
a lower jacket that the upper jacket is telescopingly coupled to;
an energy absorbing strap operatively coupled to the upper jacket and the lower jacket, the energy absorbing strap having a first leg, a second leg and a U-shaped portion connecting the first leg and the second leg;
a pin located within a slot defined by the first leg and the second leg of the energy absorbing strap; and
a bolt extending through the first leg and the second leg of the energy absorbing strap.

3. The steering column assembly of claim 2, further comprising a nut coupled to the bolt to secure the bolt to the energy absorbing strap.

4. The steering column assembly of claim 2, wherein the bolt extends through a wire harness mounting hole defined by the lower jacket.

5. A steering column assembly comprising:
an upper jacket;
a lower jacket that the upper jacket is telescopingly coupled to;
an energy absorbing strap operatively coupled to the upper jacket and the lower jacket, the energy absorbing strap having a first leg, a second leg and a U-shaped portion connecting the first leg and the second leg; and
a resistance feature located within a slot defined by the first leg and the second leg of the energy absorbing strap, wherein an entirety of the resistance feature is in contact with, and extends from, an inner surface of one of the legs of the energy absorbing strap.

6. The steering column assembly of claim 5, wherein the resistance feature is a bump extending from the inner surface of one of the legs of the energy absorbing strap.

7. The steering column assembly of claim 6, wherein the bump is operatively coupled to the energy absorbing strap.

8. The steering column assembly of claim 6, wherein the bump is integrally formed with the energy absorbing strap.

\* \* \* \* \*